United States Patent
Lee et al.

(10) Patent No.: US 9,081,266 B2
(45) Date of Patent: Jul. 14, 2015

(54) LIGHT SOURCE MODULE AND PROJECTION DEVICE USING THE SAME

(75) Inventors: Hung-Lin Lee, Hsin-Chu (TW); Liang-Wei Chen, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 406 days.

(21) Appl. No.: 13/551,657

(22) Filed: Jul. 18, 2012

(65) Prior Publication Data
US 2013/0120719 A1    May 16, 2013

(30) Foreign Application Priority Data
Nov. 15, 2011    (CN) .......................... 2011 1 0369695

(51) Int. Cl.
G03B 21/14    (2006.01)
G03B 21/20    (2006.01)
F21V 8/00    (2006.01)

(52) U.S. Cl.
CPC .......... *G03B 21/2033* (2013.01); *G02B 6/0006* (2013.01)

(58) Field of Classification Search
CPC .... G02B 19/0057; G02B 1/20; G02B 6/0006; F21V 5/04
USPC .............................. 353/97, 119; 362/235, 581
See application file for complete search history.

(56) References Cited

U.S. PATENT DOCUMENTS

| | | | |
|---|---|---|---|
| 5,191,481 A * | 3/1993 | Takizawa et al. | 359/811 |
| 6,665,331 B2 | 12/2003 | Chien | |
| 7,502,176 B2 | 3/2009 | Mino et al. | |
| 2007/0071044 A1* | 3/2007 | Takahashi | 372/34 |
| 2009/0040753 A1* | 2/2009 | Matsumoto et al. | 362/227 |

FOREIGN PATENT DOCUMENTS

| | | |
|---|---|---|
| CN | 2758580 Y | 2/2006 |
| CN | 2797859 Y | 7/2006 |
| CN | 201772362 U | 3/2011 |
| CN | 102033289 A | 4/2011 |
| KR | 10-0926772 B1 | 11/2009 |
| KR | 10-0978198 B1 | 8/2010 |

OTHER PUBLICATIONS

China Patent Office, "Office Action", Aug. 4, 2014.

* cited by examiner

*Primary Examiner* — Sultan Chowdhury
*Assistant Examiner* — Danell L Owens
(74) *Attorney, Agent, or Firm* — WPAT, PC; Justin King

(57) ABSTRACT

A light source module includes a shell, a fixed ring, an optical element, a first cover and a light-emitting element. The shell is formed as a tubular shape. The fixed ring, the optical element and the light-emitting element are all received in an inside of the shell, and the first cover is disposed at an end of the shell. In addition, the shell has a first stop part disposed in the inside of the shell, the optical element is disposed between the first stop part and the fixed ring, and the optical element is leant against the first stop part and the fixed ring. The light-emitting element is disposed between the fixed ring and the first cover, and is leant against the fixed ring and the first cover. A projection device using the source light module is also provided.

13 Claims, 10 Drawing Sheets

LIGHT SOURCE MODULE AND PROJECTION DEVICE USING THE SAME

FIELD OF THE INVENTION

The invention relates to a light source module, and more particularly to a light source module applicable to projection devices, and a projection device using the light source module.

BACKGROUND OF THE INVENTION

In recent years, with advances in technology, the requirement of image quality becomes higher, and, therefore, it is necessary to improve the brightness or other parameters to increase the image quality. For this reason, to provide a light element having higher efficiency (e.g. higher brightness, purer color, longer lifetime) to a projection device is necessary. The laser diode is the better selection to satisfy the requirement of the light element, and the application of the laser diode is revealed in U.S. Pat. Nos. 7,502,176 and 6,665,331. In addition, in order to enable the projection device to satisfy the requirement of the high brightness, a light module with dozens of the laser diodes is provided in prior art.

FIG. 1A is an exploded schematic diagram of a conventional laser diode module. FIG. 1B is an assembled schematic diagram of the conventional laser diode module of FIG. 1A. Referring to FIGS. 1A and 1B, the conventional laser diode module 100 includes a lens bracket 120, a lens holder 140, a laser diode holder 160, a plurality of laser diodes 180, and a plurality of lenses 190. The laser diode holder 160 has a plurality of mounting holes 162 for receiving the laser diodes 180 therein. The lens holder 140 is disposed on the laser diode holder 160 and has a plurality of holding holes 142 for receiving the lenses 190 therein. Each lens 190 is disposed to correspond to one of the laser diodes 180. The lens bracket 120 is disposed on the lens holder 140 and has a plurality of locating holes 122 for fixing the lenses 190.

The machining tolerances are generated while manufacturing the components of the conventional laser diode module 100. The accumulation of these machining tolerances results in poor performance of the conventional laser diode module 100. Specifically, the machining tolerances include the diameter tolerance of each locating hole 122 of the lens bracket 120, the spacing tolerance between each two neighboring locating holes 122, the diameter tolerance of each holding hole 142 of the lens holder 140, the spacing tolerance between each two neighboring holding holes 142, the diameter tolerance of each mounting hole 162 of the laser diode holder 160, and the spacing tolerance between each two neighboring mounting holes 162. In addition, the bending deformation of the lens bracket 120, the lens holder 140 and the laser diode holder 160 may occur in the assembly process or in the production process, and thus the flatness of the lens bracket 120, the lens holder 140 and the laser diode holder 160 is reduced. Therefore, the spacing between the lens bracket 120 and the lens holder 140 is not uniform. Similarly, the spacing between the lens holder 140 and the laser diode holder 160 is not uniform. For these reasons, in the conventional laser diode module 100, it is hard to precisely align the optical axis of each laser diode 180 with the optical axis of the corresponding lens 190. Therefore, the concentricity accuracy between each laser diode 180 and the corresponding lens 190 is poor, and thus the illuminating efficiency of the conventional laser diode module 100 is reduced.

In addition, the temperature of the laser diodes 180 is enhanced when the laser diodes 180 work, and therefore the laser diodes 180 cannot be fixed by adhesive, but must be gripped and fixed by the laser diode holder 160 and the lens holder 140. However, the size of the laser diode holder 160 is too large and thus is easily out of shape, so it is difficult to let the flatness of the laser diode holder 160 satisfy a predetermined standard. Therefore, some of the laser diodes 180 cannot be gripped and fixed, and the laser diodes 180 and the lenses 190 cannot be precisely assembled. Furthermore, the lens bracket 120, the lens holder 140 and the laser diode holder 160 are formed with many holes such as the locating holes 122, the holding holes 142 and the mounting holes 162, so the structure strength of the lens bracket 120, the lens holder 140 and the laser diode holder 160 is relatively frail. Therefore, the lens bracket 120, the lens holder 140 and the laser diode holder 160 are easily bent and deformed because of the high temperature generated in the machining process and the pressure generated from clamping the laser diodes 180 and the lenses 190, and thus the laser diodes 180 and the lenses 190 cannot be precisely assembled, thereby reducing the illuminating efficiency of the conventional laser diode module 100.

In addition, in the conventional laser diode module 100, the relative position of each laser diode 180 and its corresponding lens 190 is fixed by the lens bracket 120, the lens holder 140 and the laser diode holder 160. During the assembly process, dozens of the laser diodes 180 and the lens 190 are placed in the lens holder 140 and the laser diode holder 160. However, after the assembly process, if the relatively position between one of the lenses 190 and its corresponding laser diode 180 is deviated, the laser diode module 100 must be reassembled. During the reassembly process, all the elements must be realigned. Therefore, the assembly process of the laser diode module 100 is complicated and has poor accuracy.

If the numbers of the laser diodes 180 are less, the assembly deviation can be ignored. However, when large numbers of the laser diodes 180 are used to increase the brightness of the projection device, the accumulation of the above-mentioned tolerances will greatly exceed the permissible range. Therefore, the conventional laser diode module 100 is adverse to be applied to the high brightness projection device.

SUMMARY OF THE INVENTION

The invention provides a light source module to enhance the illuminating efficiency and the assembly accuracy.

The invention further provides a projection device to enhance the brightness of a projected image.

In order to achieve at least one of the above-mentioned or other advantages, an embodiment of the invention provides a light source module, including a shell, a fixed ring, an optical element, a first cover and a light-emitting element. The shell is formed as a tubular shape. The fixed ring, the optical element and the light-emitting element are all received in an inside of the shell, and the first cover is disposed at one end of the shell. In addition, a first stop part is disposed in the inside of the shell, the optical element is disposed between the first stop part and the fixed ring, and the optical element is leant against the first stop part and the fixed ring. The light-emitting element is disposed between the fixed ring and the first cover, and is leant against the fixed ring and the first cover.

In an embodiment of the invention, the shell further includes a first inner surface, a second inner surface and a connecting surface. A diameter of the first inner surface is less than a diameter of the second inner surface, the connecting surface is connected between the first inner surface and the second inner surface, the first inner surface defines a first receiving space, the second inner surface defines a second receiving space, the optical element is located in the first receiving space, the light-emitting element is located in the second receiving space, and the first stop part is disposed on the first inner surface.

In an embodiment of the invention, the fixed ring, for example, includes a first ring part and a second ring part connected with the first ring part. An outer diameter of the first ring part is less than an outer diameter of the second ring part, the first ring part is leant against the optical element, an outer wall of the first ring part contacts with the first inner surface, the second ring part is leant against the light-emitting element, and an outer wall of the second ring part contacts with the second inner surface.

In an embodiment of the invention, the shell, for example, further includes a first inner surface, a second inner surface and a connecting surface. A diameter of the first inner surface is less than a diameter of the second inner surface, and the connecting surface is connected between the first inner surface and the second inner surface. In addition, the first inner surface defines a first receiving space, and the second inner surface defines a second receiving space. The optical element is located in the first receiving space, and the light-emitting element is located in the second receiving space. The first stop part is disposed on the first inner surface. Furthermore, the fixed ring is located in the second receiving space, and an outer wall of the fixed ring contacts with the second inner surface.

In an embodiment of the invention, the shell further includes a third inner surface. The second inner surface is located between the first inner surface and the third inner surface. A diameter of the third inner surface is greater than that of the second inner surface. The third inner surface defines a third receiving space, and the first cover is located in the third receiving space.

In an embodiment of the invention, the shell further includes a second stop part disposed on an outer wall of the shell. Furthermore, the outer wall of the shell, for example, includes a first outer surface and a second outer surface. A diameter of the first outer surface is less than that of the second outer surface. The second stop part is disposed at a junction of the first outer surface and the second outer surface.

In an embodiment of the invention, a second stop part is disposed on an outer wall of the shell. Besides, the second stop part is located around the optical element.

In an embodiment of the invention, a second stop part is disposed on an outer wall of the shell. Besides, the light source module, for example, further includes a first fixed plate and a second fixed plate. The first fixed plate has at least one first hole, and the second fixed plate has at least one second hole corresponding to the first hole. The shell is corresponding located in the first hole and the second hole, and the second stop part of the shell is clamped by the first fixed plate and the second fixed plate.

In an embodiment of the invention, the optical element, for instance, further includes a lens.

In an embodiment of the invention, the shell, for example, includes a main body and a second cover. The fixed ring, the optical element and the light-emitting element are received in the main body. The first cover is disposed at a first end of the main body, and the second cover is disposed at a second end of the main body. Furthermore, the second end is opposite to the first end, and the second cover has the first stop part.

In an embodiment of the invention, the optical element, for example, includes a base, at least one light-emitting unit and a lampshade. An edge of the base is leant against the fixed ring and the first cover. The light-emitting unit and the lampshade are disposed on the base, wherein the lampshade covers the light-emitting unit.

Another embodiment of the invention provides a projection device including a light source module, a light valve and a projection lens. The light source module is configured for providing an illumination beam. The light valve is disposed on a transmission path of the illumination beam, and the light valve is configured for converting the illumination beam into an image beam. The projection lens is disposed on a transmission path of the image beam. Besides, the light source module includes a shell, a fixed ring, an optical element, a first cover and optical light-emitting element. The shell is formed as a tubular shape. The fixed ring, the optical element and the light-emitting element are received in an inside of the shell, and the first cover is disposed at one end of the shell. Furthermore, a first stop part is disposed in the inside of the shell. The optical element is located between the first stop part and the fixed ring, and is leant against the first stop part and the fixed ring. The light-emitting element is located between the fixed ring and the first cover, and is leant against the fixed ring and the first cover.

The light source module of the invention uses the shell, the fixed ring and the first cover to fix the relative position of the optical element and the light-emitting element. The shell, the fixed ring and the first cover are used to fix only one optical element and only one light-emitting element, so the relative position of the optical element and the light-emitting element can be fixed accurately, and thus, the concentricity accuracy of the optical element and the light-emitting element can be enhanced to increase the illuminating efficiency of the light source module. Therefore, the brightness of an image projected by the projection device of the invention can be enhanced.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
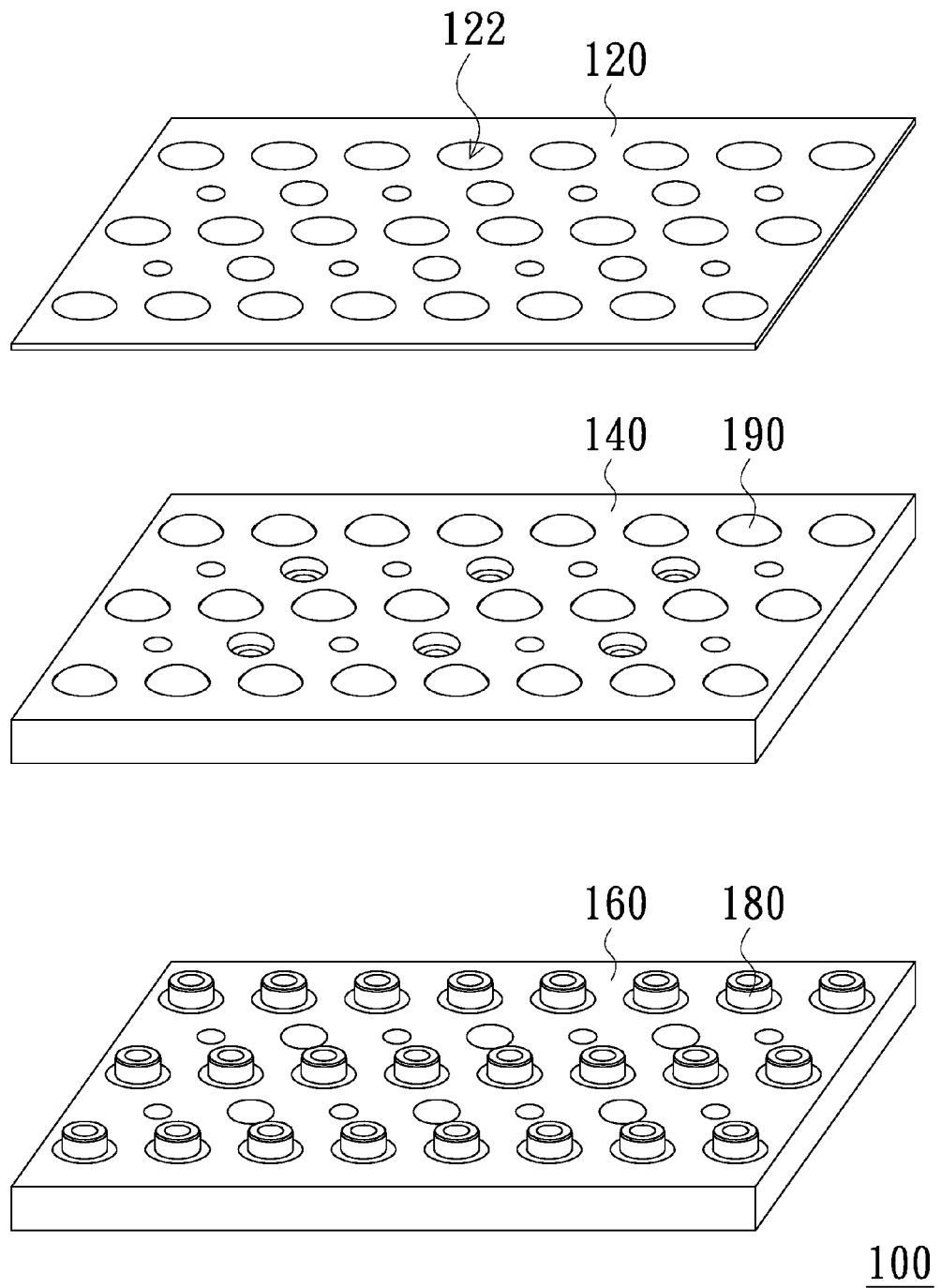
FIG. 1A is an exploded schematic diagram of a conventional laser diode module.
Figure 1B:
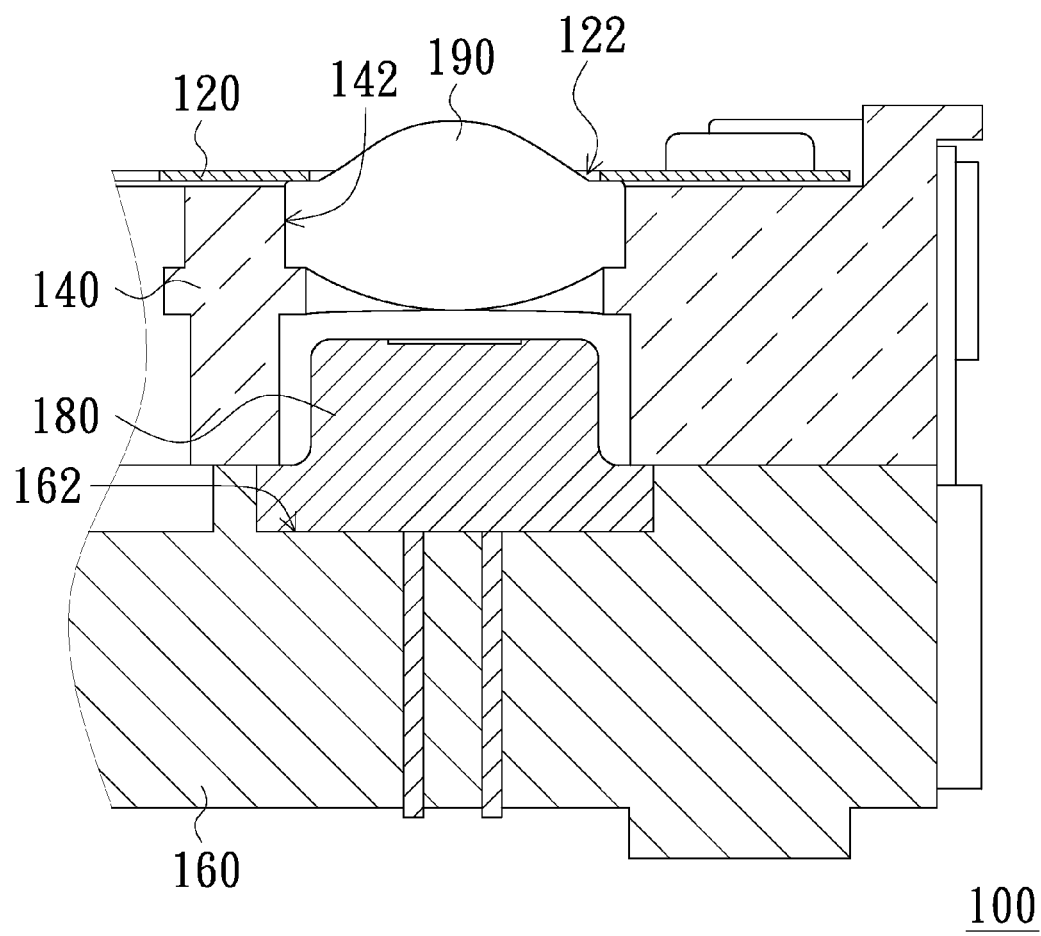
FIG. 1B is an assembled schematic diagram of the conventional laser diode module of FIG. 1A.
Figure 2A:
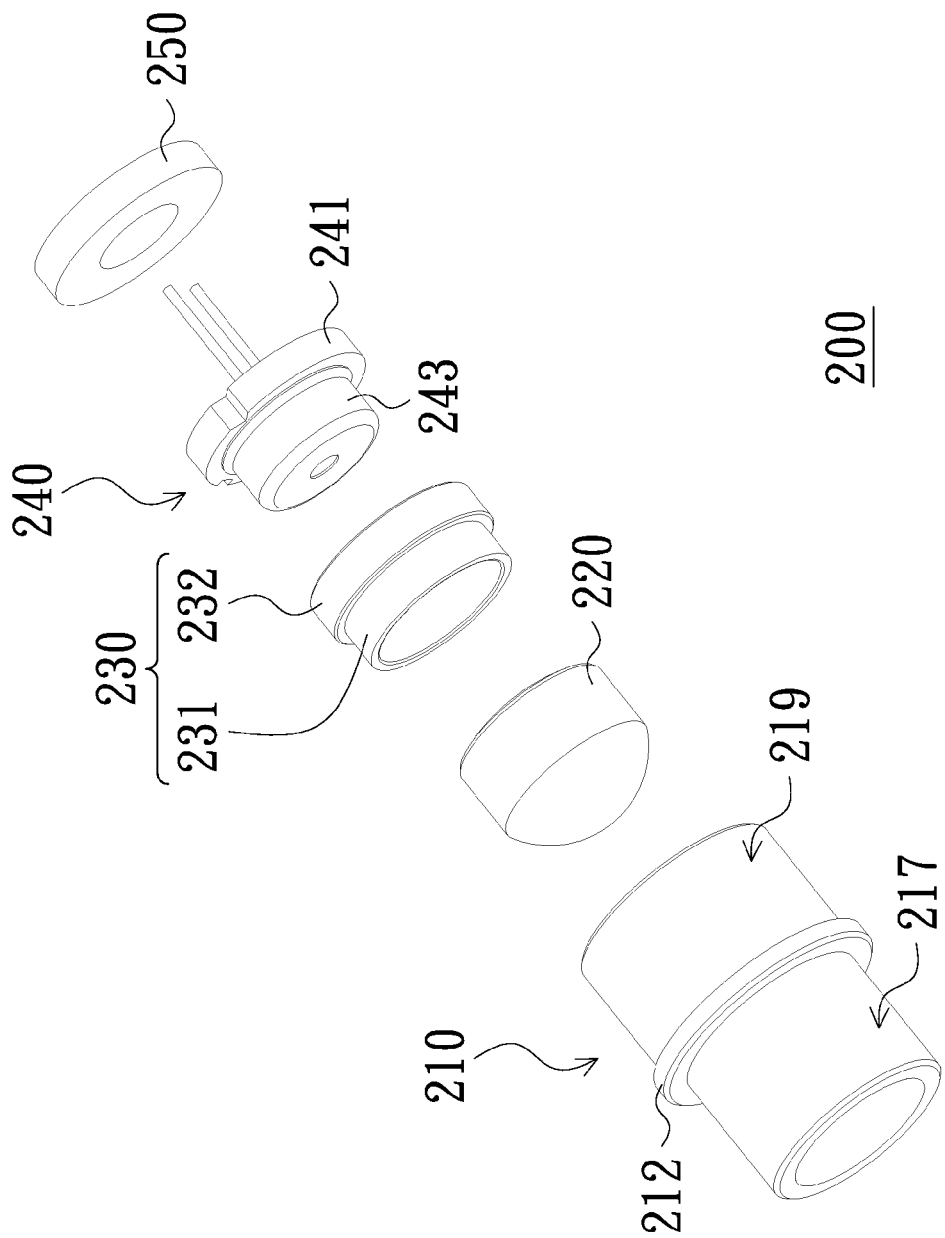
FIG. 2A is an exploded schematic diagram of a light source module of an embodiment of the invention.
Figure 2B:
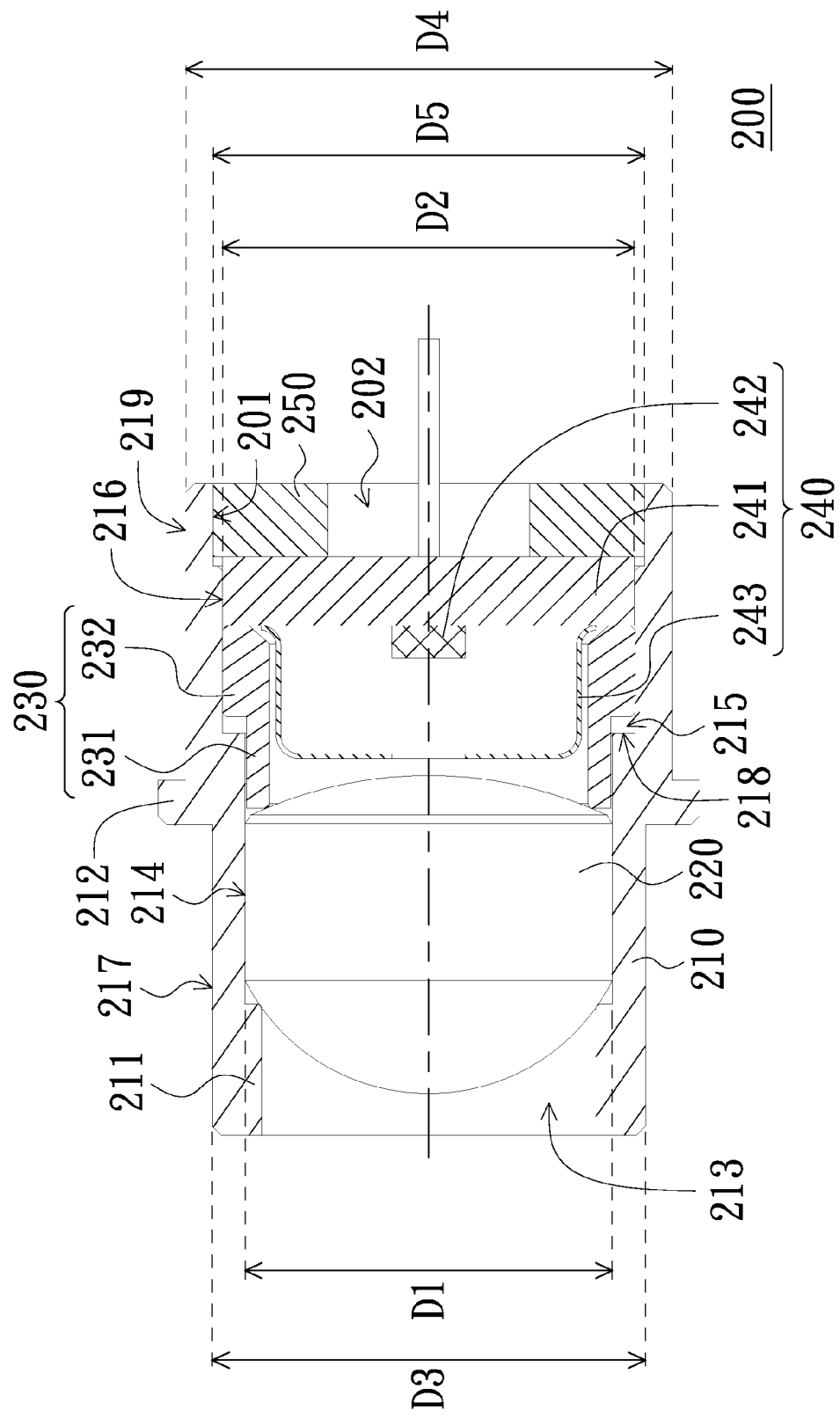
FIG. 2B is a cross-section schematic diagram of the light source module of FIG. 2A after being assembled.

FIG. 2A is an exploded schematic diagram of a light source module of an embodiment of the invention. FIG. 2B is a cross-section schematic diagram of the light source module of FIG. 2A after being assembled. Please refer to FIG. 2A and FIG. 2B. A light source module 200 of the embodiment includes a shell 210, an optical element 220, a fixed ring 230, a light-emitting element 240 and a first cover 250. The shell 210 is formed as a tubular shape. The fixed ring 230, the optical element 220 and the light-emitting element 240 are all received in an inside of the shell 210, and the first cover 250 is disposed at one end of the shell 210. In addition, a first stop part 211 is disposed in the inside of the shell 210, the optical element 220 is located between the first stop part 211 and the fixed ring 230, and the optical element 220 is leant against the first stop part 211 and the fixed ring 230. The light-emitting element 240 is disposed between the fixed ring 230 and the first cover 250, and is leant against the fixed ring 230 and the first cover 250. The first cover 250 can be coated with a heat dissipation material. The heat dissipation material contacts with the light-emitting element 240 to dissipate the heat generated by the light-emitting element 240.

The optical element 220 can be a lens such as a focusing lens. In another embodiment, the lens can be a diverging lens. In addition, the optical element 220 can include more than one lens. In another embodiment, the optical element 220 can be other element with light diffusing function, light condensing function or light uniforming function.

In the light source module 200, the light-emitting element 240 may include a base 241, at least one light-emitting unit 242 and a lampshade 243. The light-emitting element 240 including one light-emitting unit 242 is served as an example in FIG. 2B. In addition, an edge of the base 241 is leant against the fixed ring 230 and the first cover 250. The light-emitting unit 242 is disposed on the base 241. The lampshade 243 is located on the base 241 and covers the light-emitting unit 242. The light-emitting unit 242 is, for example, a laser diode (LD) chip, a light-emitting diode (LED) chip or an organic light-emitting diode (OLED) chip.

In the embodiment, the shell 210 may include a first inner surface 241, a second inner surface 216 and a connecting surface 218. Each of the first inner surface 214 and the second inner surface 216 is, for instance, an annular surface. A diameter D1 of the first inner surface 214 is, for example, less than a diameter D2 of the second inner surface 216. The connecting surface 218 is connected between the first inner surface 214 and the second inner surface 216, and the connecting surface 218 is, for instance, perpendicular to the first inner surface 214 and the second inner surface 216. In addition, the first inner surface 214 defines a first receiving space 213, and the second inner surface 216 defines a second receiving space 215. The optical element 220 is, for example, received in the first receiving space 213. The light-emitting element 240 is, for instance, located in the second receiving space 215. The first stop part 211 is, for example, disposed at the first inner surface 214. The first stop part 211 is, for instance, extended directly from the first inner surface 214. In addition, the material of the shell 210 can be, but not limited to, plastic or metal. Furthermore, the shell 210 can further include a third inner surface 201, and the second inner surface 216 is located between the first inner surface 214 and third inner surface 201. The third inner surface 201 is, for instance, an annular surface. A diameter D5 of the third inner surface 201 is, for example, greater than the diameter D2 of the second inner surface 216 so that the light-emitting element 240 can be inserted in the second receiving space 215. The third inner surface 201 defines a third receiving space 202, and the first cover 250 is, for instance, disposed in the third receiving space 202. It should be noted that in another embodiment, the third inner surface 201 and the third receiving space 202 can be omitted, while the first cover 250 is disposed in the second receiving space 215.

In the light source module 200, the material of the fixed ring 230 may be, but not limited to, plastic or metal. The fixed ring 230 may include a first ring part 231 and a second ring part 232, wherein the first ring part 231 and the second ring part 232 are connected with each other. The first ring part 231 is, for example, disposed in a space surrounded by the first inner surface 214, so that the optical element 220 is clamped and fixed by the first ring part 231 and the first stop part 211. The second ring part 232 is, for example, disposed in a space surrounded by the second inner surface 216, so that the base 241 of the light-emitting element 240 is clamped and fixed by the first cover 250 and the second ring part 232. Therefore, in the embodiment, an outer diameter of the first ring part 231 is, for instance, less than an outer diameter of the second ring part 232. An outer wall of the first ring part 231 may contact with the first inner surface 214, and an outer wall of the second ring part 232 may contact with the second inner surface 216. An outer wall of the first cover 250 may contact with the third inner surface 201. In other words, the first ring part 231 fits tightly with the first inner surface 214, the second ring part 232 fits tightly with the second inner surface 216, and the first cover 250 fits tightly with the third inner surface 201 to prevent the first ring part 231, the second ring part 232 and the first cover 250 from shaking. Therefore, a relative position of the optical element 220 and the light-emitting element 240 can be fixed firmly, the concentricity accuracy of the optical element 220 and the light-emitting element 240 can be enhanced, and then the illuminating efficiency of the light source module 200 can be enhanced. In addition, according to the present manufacturing technology, the machining tolerance of the tubular structure and the annularity structure is smaller. Therefore, the specification of the shell 210 and the fixed ring 230 can be precisely manufactured to increase the alignment accuracy of the optical element 220 and the light-emitting element 240.

It should be noted that a second stop part 212 may be disposed on an outer wall of the shell 210 of the embodiment. The outer wall of the shell 210 may include a first outer surface 217 and a second outer surface 219. A diameter D3 of the first outer surface 217 is, for example, less than a diameter D4 of the second outer surface 219. The second stop part 212 is, for instance, located at a junction of the first outer surface 217 and the second outer surface 219. In the embodiment, due to the second stop part 212, the shell 210 can be conveniently fixed to two fixed plate introduced in the following description.

Figure 3A:
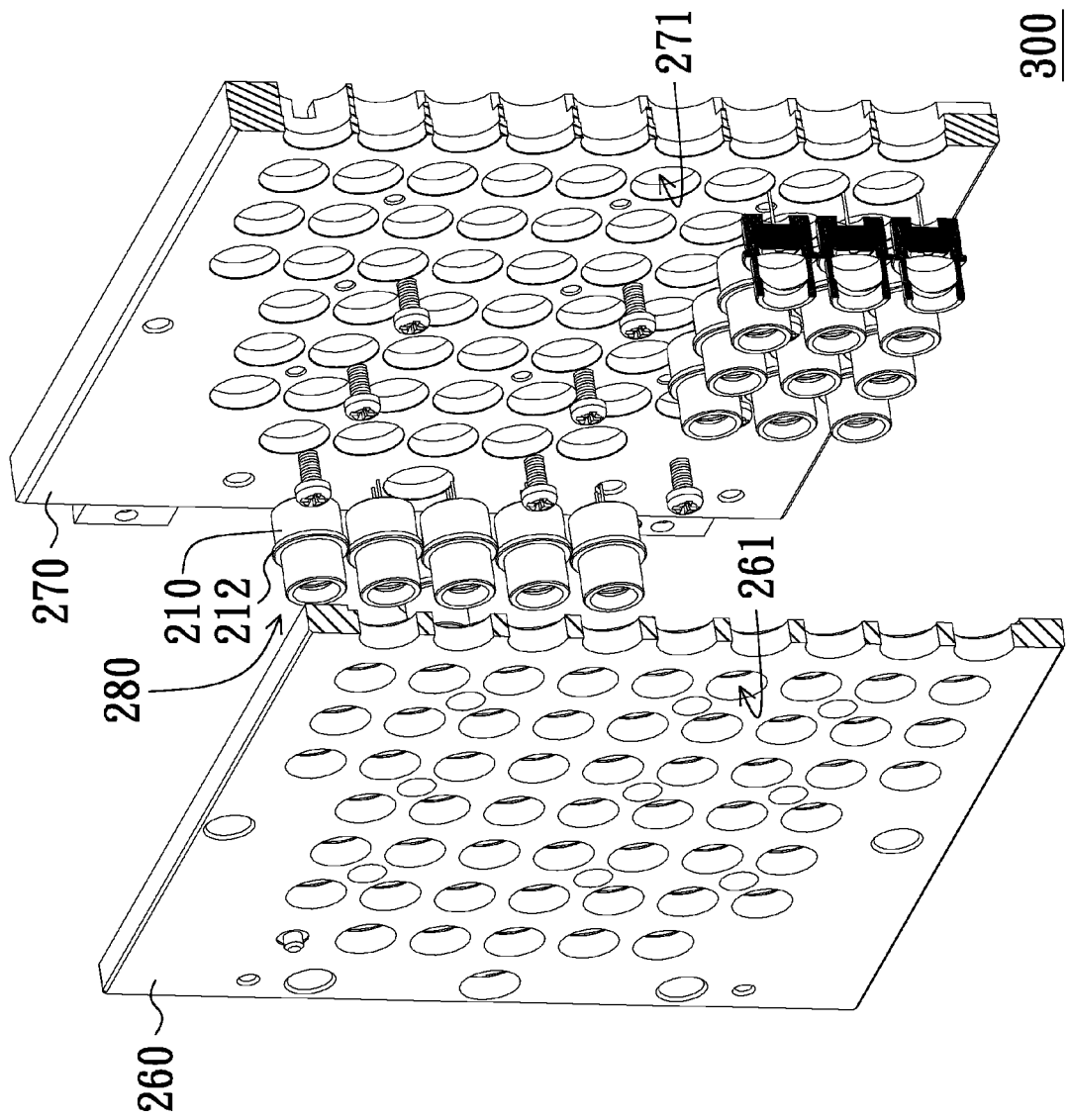
FIG. 3A is an exploded schematic diagram of a light source module of another embodiment of the invention.
Figure 3B:
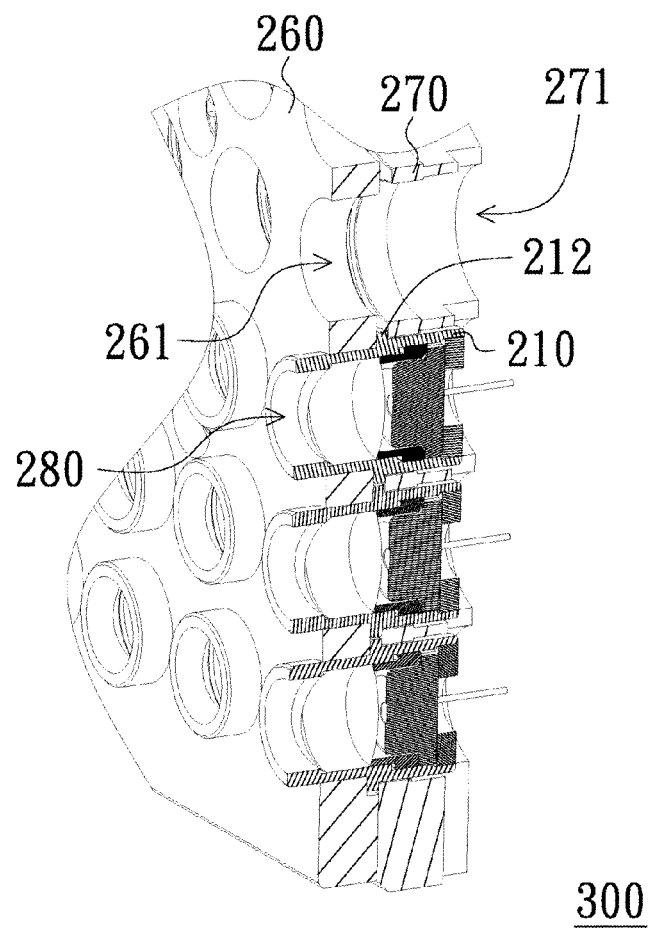
FIG. 3B is an assembled schematic diagram of the light source module of FIG. 3A.

FIG. 3A is an exploded schematic diagram of a light source module of another embodiment of the invention. FIG. 3B is an assembled schematic diagram of the light source module of FIG. 3A. Please refer to FIG. 2B, FIG. 3A and FIG. 3B. The light source module 300 of the embodiment includes a first fixed plate 260, a second fixed plate 270 and a light-emitting component 280. The light-emitting component 280 is, for example, assembled of the shell 210, the optical element 220, the fixed ring 230, the light-emitting element 240 and the first cover 250 shown in FIG. 2B. The first fixed plate 260 has at least one first hole 261, and the second fixed plate 270 has at least one second hole 271 corresponding to the first hole 261. The first fixed plate 260 with a plurality of the first holes 261 and the second fixed plate 270 with a plurality of the second holes 271 are shown as an example in FIG. 3A and FIG. 3B. The shell 210 of the light-emitting component 280 is correspondingly disposed in the first hole 261 and the second hole 271. The second stop part 212 of the shell 210 is clamped by the first fixed plate 260 and the second fixed plate 270, so that the shell 210 can be fixed between the first fixed plate 260 and the second fixed plate 270, and thus the light-emitting component 280 can be fixed between the first fixed plate 260 and the second fixed plate 270. The light source module 300 can include a plurality of the light-emitting components 280, and the light-emitting components 280 can be assembled into one device by using the first fixed plate 260 and the second fixed plate 270. Such that, the light source module 300 is capable of providing high-brightness illuminating light. Moreover, the concentricity accuracy between the optical element 220 and the light-emitting element 240 of each light-emitting component 280 is better, so that the illuminating efficiency of the light source module 300 is improved. In addition, if one of the light-emitting components 280 is bad, only the bad light-emitting component 280 needs to be re-assembled and the other light-emitting components 280 need not to be re-assembled. Therefore, the assembly efficiency of the light source module 300 can be enhanced.

Figure 4:
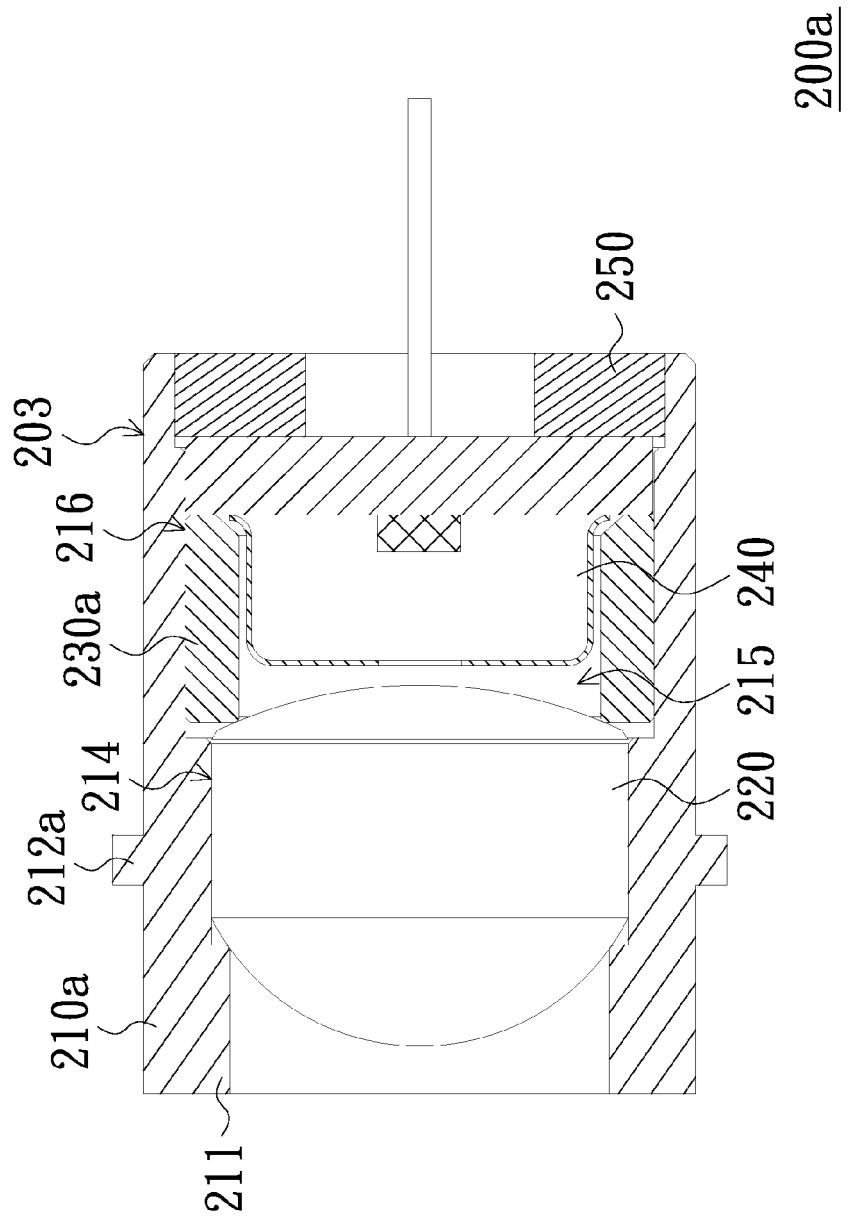
FIG. 4 is a schematic diagram of a light source module of another embodiment of the invention.

FIG. 4 is a schematic diagram of a light source module of another embodiment of the invention. Referring to FIG. 4, the structure of a light source module 200a of the embodiment is similar to the structure of the light source module 200 of FIG. 2B. The difference is that a fixed ring 230a of the light source module 200a has a ring part received in the second receiving space 215, but does not have any ring part received in the first receiving space 213. Besides, a diameter of an outer surface 203 of a shell 210a is uniform, and a second stop part 212a is disposed on the outer surface 203, such that the fixed ring 230a and the shell 210a can be more easily fabricated and the machining accuracy of the fixed ring 230a and the shell 210a is consequently improved. In addition, in the embodiment, the location of the second stop part 212a of the shell 210a is closer to the first stop part 211, and the second stop part 212a is, for example, disposed around the optical element 220.

Figure 5:
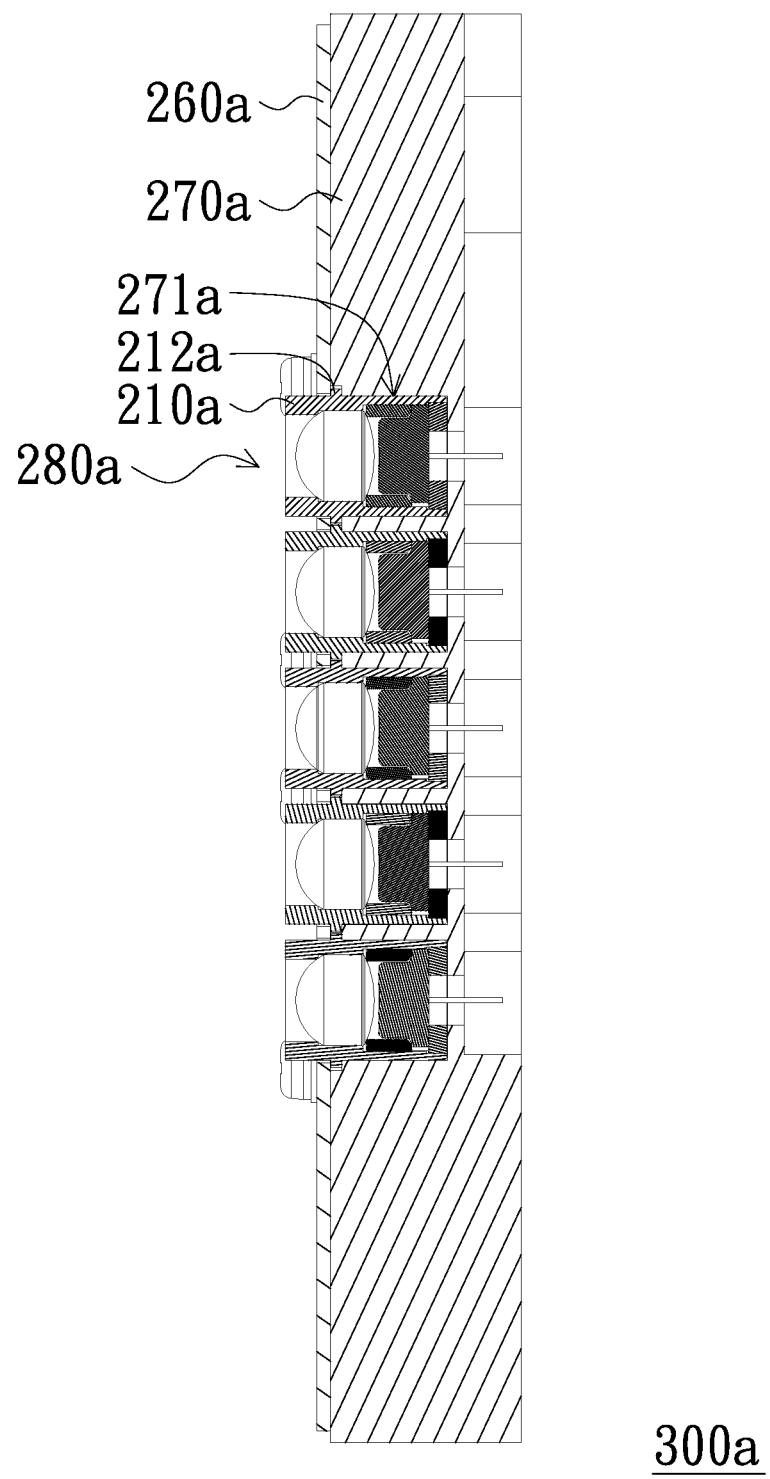
FIG. 5 is a schematic diagram of a light source module of another embodiment of the invention.

FIG. 5 is a schematic diagram of a light source module of another embodiment of the invention. Referring to FIG. 4 and FIG. 5, the light source module 300a of the embodiment includes a first fixed plate 260a, a second fixed plate 270a and a plurality of light-emitting components 280a. Each light-emitting component 280a is, for example, assembled of the shell 210a, the optical element 220, the fixed ring 230a, the light-emitting element 240 and the first cover 250 of FIG. 4. In the embodiment, the second stop part 212a of the shell 210a is disposed around the optical element 220, a thickness of the second fixed plate 270a is thicker, and a depth of the second hole 271a is deeper, so the light-emitting component 280a can be further prevented from shaking or shifting in the second hole 271a, and the alignment accuracy of the light-emitting component 280a is further improved. In addition, in the embodiment described in FIG. 2B, the second stop part 212 can be disposed around the optical element 220.

Figure 6:
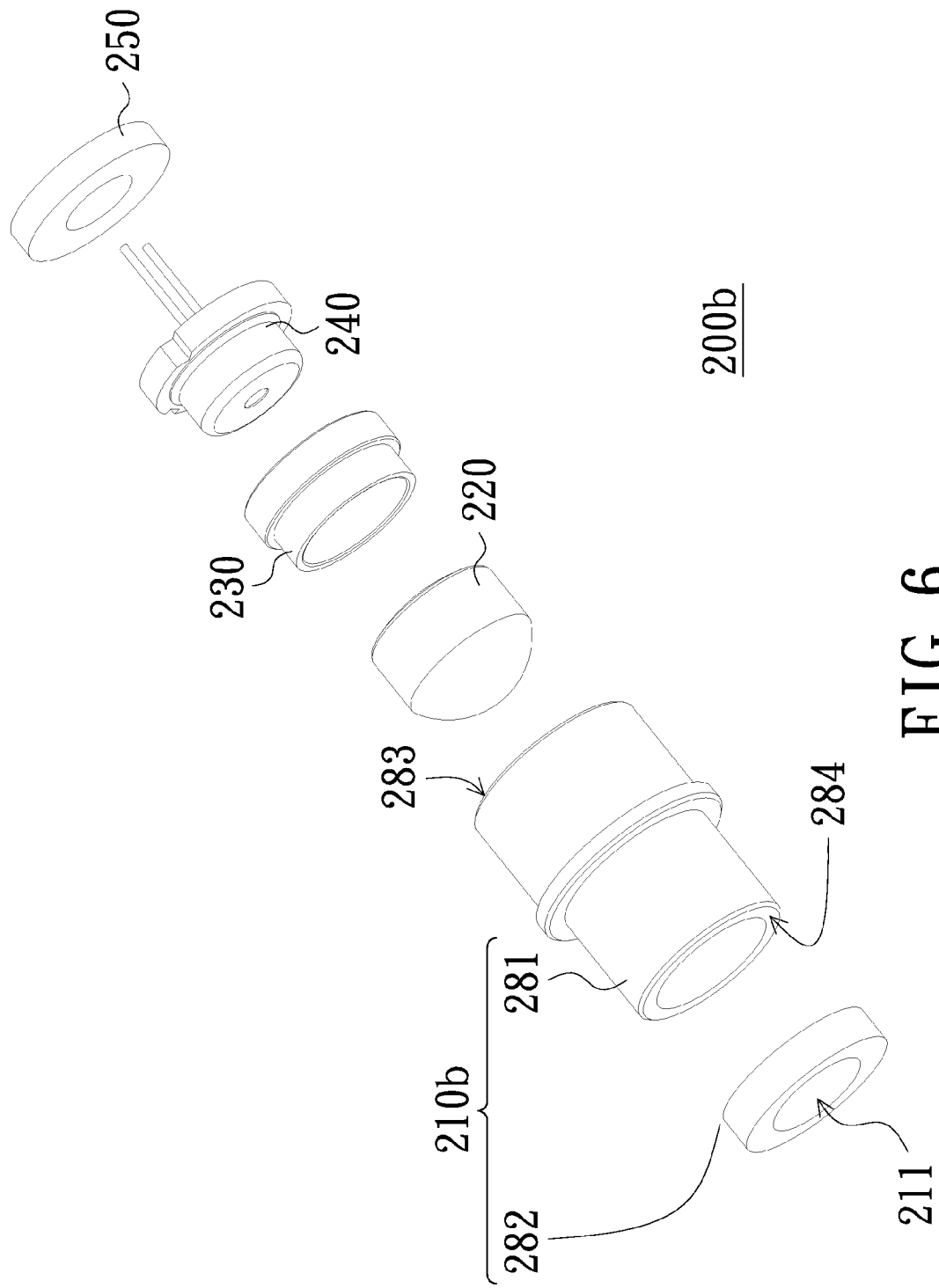
FIG. 6 is an exploded schematic diagram of a light source module of another embodiment of the invention.

In the embodiment described in FIG. 2B, the first stop part 211 is, for example, extended directly from the first inner surface 214. In another embodiment, the first stop part 211 may be an element which could be separated from the first inner surface 214. FIG. 6 is an exploded schematic diagram of a light module of another embodiment of the invention. Referring to FIG. 6, in a light source module 200b, a shell 210b may include a main body 281 and a second cover 282. The fixed ring 230, the optical element 220 and the light-emitting element 240 are contained in the main body 281. The first cover 250 is disposed at a first end 283 of the main body 281. The second cover 282 is disposed at a second end 284 of the main body 281. The second end 284 is opposite to the first end 283. The first stop part 211 is disposed on the second cover 282. Therefore, in the embodiment, the optical element 220 can be inserted into the main body 281 from the second end 284 before the second cover 282 is combined with the main body 281. The manner of combining the second cover 282 with the main body 281 may be, but not limited to, a screwing manner or a wedging manner.

Figure 7:
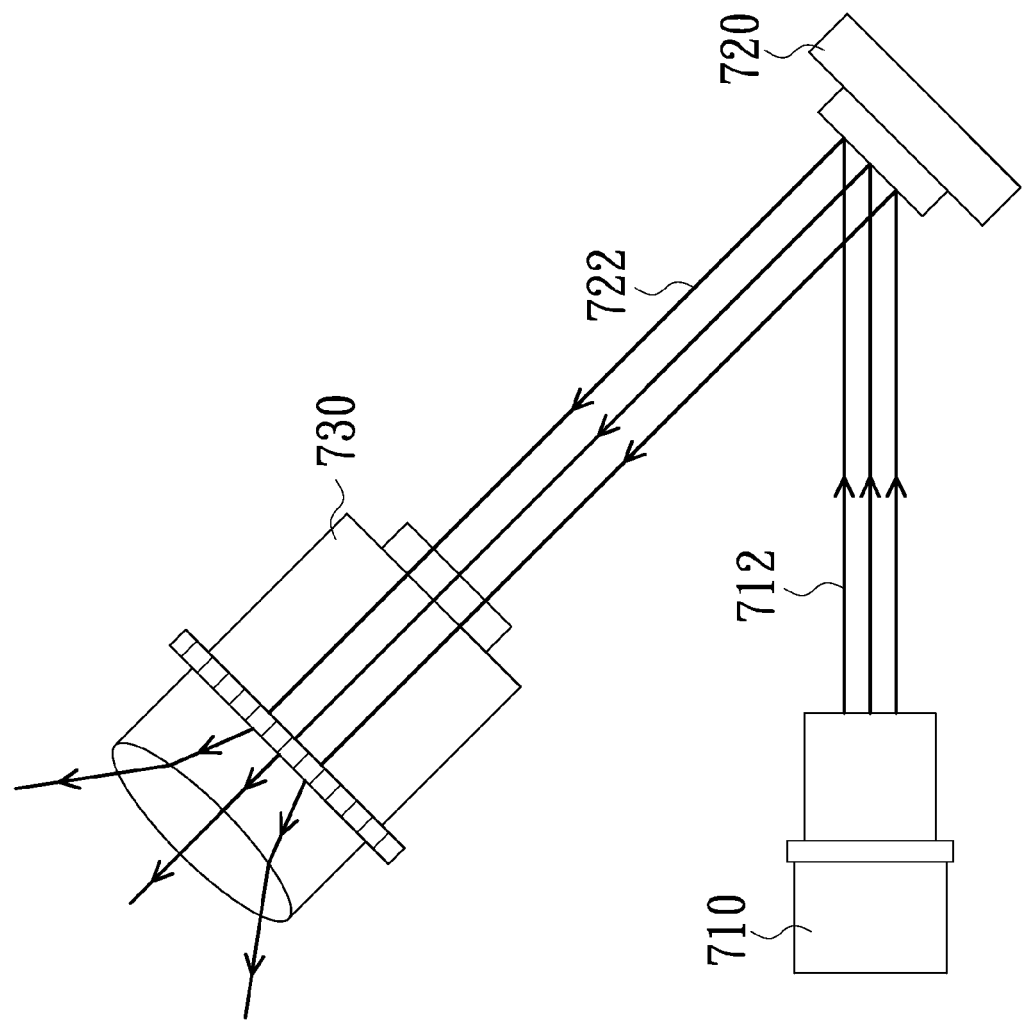
FIG. 7 is a schematic diagram of a projection device of an embodiment of the invention.

FIG. 7 is a schematic diagram of a projection device of an embodiment of the invention. Referring to FIG. 7, a projection device 700 of the embodiment includes a light source module 710, a light valve 720 and a projection lens 730. The light source module 710 is configured for providing an illumination beam 712. The light valve 720 is disposed on a transmission path of the illumination beam 712 and configured for converting the illumination beam 712 into an image beam 722. The projection lens 730 is disposed on a transmission path of the image beam 722. The light source module 710 may be any one of the light source modules described in the above-mentioned embodiments. The light valve 720 of the embodiment is a reflective light valve, such as a digital micromirror device (DMD) or a liquid crystal on silicon panel (LCOS panel). In another embodiment, the light valve 720 is, for instance, a transmissive light valve (not shown). But in this case, the relative position of the projection lens 730 and the transmissive light valve need to be adjusted appropriately.

The light source module 710 used in the projection device 700 of the embodiment has better illuminating efficiency, so the projection brightness of the projection device 700 can be enhanced. In addition, in another embodiment, the number of the light source module 710 may be plural, and the illumination beams of the light source modules 710 may be combined by using a light combining element.

In summary, the light source module of the invention uses the shell, the fixed ring and the first cover to fix the relative position of the optical element and the light-emitting element. The shell, the fixed ring and the first cover are used to fix only one optical element and only one light-emitting element, so the relative position of the optical element and the light-emitting element can be fixed accurately. Thus, the concentricity accuracy of the optical element and the light-emitting element can be enhanced, and the illuminating efficiency of the light source module can be improved. Therefore, the projection brightness of the projection device of the invention can be upgraded.

In addition, in the embodiment that the light source module includes a plurality of the light-emitting components, the concentricity accuracy of the optical element and the light-emitting element of each light-emitting component is better, so the illuminating efficiency can be enhanced. Moreover, if one of the light-emitting components is bad, only the bad light-emitting component needs to be re-assembled and the other light-emitting components need not to be re-assembled. Therefore, the assembly efficiency of the light source module can be enhanced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A light source module, comprising:
a shell formed as a tubular shape and comprising a first stop part and a second stop part, wherein the first stop part is disposed in an inside of the shell, the second stop part is located on an outer wall of the shell, the outer wall of the shell comprises a first outer surface and a second outer surface, a diameter of the first outer surface is less than a diameter of the second outer surface, and the second stop part is disposed at a junction of the first outer surface and the second outer surface;
a fixed ring disposed in the inside of the shell;
an optical element disposed in the inside of the shell and located between the first stop part and the fixed ring, the optical element being leant against the first stop part and the fixed ring;
a first cover disposed at one end of the shell; and
a light-emitting element disposed in the inside of the shell and located between the fixed ring and the first cover, the light-emitting element being leant against the fixed ring and the first cover.

2. The light source module according to claim 1, wherein the shell further includes a first inner surface, a second inner surface and a connecting surface, a diameter of the first inner surface is less than a diameter of the second inner surface, the connecting surface is connected between the first inner surface and the second inner surface, the first inner surface defines a first receiving space, the second inner surface defines a second receiving space, the optical element is located in the first receiving space, the light-emitting element is located in the second receiving space, and the first stop part is disposed on the first inner surface.

3. The light source module according to claim 2, wherein the fixed ring includes a first ring part and a second ring part connected with the first ring part, an outer diameter of the first ring part is less than an outer diameter of the second ring part, the first ring part is leant against the optical element, an outer wall of the first ring part contacts with the first inner surface, the second ring part is leant against the light-emitting element, and an outer wall of the second ring part contacts with the second inner surface.

4. The light source module according to claim 2, wherein the fixed ring is located in the second receiving space, and an outer wall of the fixed ring contacts with the second inner surface.

5. The light source module according to claim 2, wherein the shell further includes a third inner surface, the second inner surface is located between the first inner surface and the third inner surface, a diameter of the third inner surface is greater than the diameter of the second inner surface, the third inner surface defines a third receiving space, and the first cover is located in the third receiving space.

6. The light source module according to claim 1, wherein the second stop part is located around the optical element.

7. The light source module according to claim 1, further including a first fixed plate and a second fixed plate, wherein the first fixed plate has at least one first hole, the second fixed plate has at least one second hole corresponding to the first hole, the shell is correspondingly located in the first hole and second hole, and the second stop part of the shell is clamped by the first fixed plate and the second fixed plate.

8. The light source module according to claim 1, wherein the optical element includes a lens.

9. The light source module according to claim 1, wherein the shell further comprises:
a main body configured for receiving the fixed ring, the optical element and the light-emitting element, the first cover disposed at a first end of the main body; and
a second cover disposed at a second end of the main body, the second end being opposite to the first end, and the second cover having the first stop part.

10. The light source module according to claim 1, wherein the light-emitting element comprises:
 a base having an edge leant against the fixed ring and the first cover;
 at least one light-emitting unit disposed on the base; and
 a lampshade disposed on the base and covering the light-emitting unit.

11. A projection device, comprising:
 a light source module configured for providing an illumination beam, and the light source module comprising:
  a shell formed as a tubular shape and including a first stop part and a second stop part, wherein the first stop part is disposed in an inside of the shell, the second stop part is located on an outer wall of the shell, the outer wall of the shell comprises a first outer surface and a second outer surface, a diameter of the first outer surface is less than a diameter of the second outer surface, and the second stop part is disposed at a junction of the first outer surface and the second outer surface;
  a fixed ring disposed in the inside of the shell;
  an optical element disposed in the inside of the shell and located between the first stop part and the fixed ring, the optical element being leant against the first stop part and the fixed ring;
  a first cover disposed at one end of the shell; and
  a light-emitting element disposed in the inside of the shell and located between the fixed ring and the first cover, the light-emitting element being leant against the fixed ring and the first cover;
 a light valve disposed on a transmission path of the illumination beam and configured for converting the illumination beam into an image beam; and
 a projection lens disposed on a transmission path of the image beam.

12. A light source module, comprising:
 a shell formed as a tubular shape and comprising a first stop part and a second stop part, wherein the first stop part is disposed in an inside of the shell, and the second stop part is located on an outer wall of the shell;
 a fixed ring disposed in the inside of the shell;
 an optical element disposed in the inside of the shell and located between the first stop part and the fixed ring, the optical element being leant against the first stop part and the fixed ring;
 a first cover disposed at one end of the shell;
 a light-emitting element disposed in the inside of the shell and located between the fixed ring and the first cover, the light-emitting element being leant against the fixed ring and the first cover; and
 a first fixed plate; and
 a second plate, wherein the first fixed plate has at least one first hole, the second fixed plate has at least one second hole corresponding to the first hole, the shell is correspondingly located in the first hole and second hole, and the second stop part of the shell is clamped by the first fixed plate and the second fixed plate.

13. A projection device, comprising:
 a light source module configured for providing an illumination beam, and the light source module comprising:
  a shell formed as a tubular shape and comprising a first stop part and a second stop part, wherein the first stop part is disposed in an inside of the shell, and the second stop part is located on an outer wall of the shell;
  a fixed ring disposed in the inside of the shell;
  an optical element disposed in the inside of the shell and located between the first stop part and the fixed ring, the optical element being leant against the first stop part and the fixed ring;
  a first cover disposed at one end of the shell;
  a light-emitting element disposed in the inside of the shell and located between the fixed ring and the first cover, the light-emitting element being leant against the fixed ring and the first cover; and
  a first fixed plate; and
  a second plate, wherein the first fixed plate has at least one first hole, the second fixed plate has at least one second hole corresponding to the first hole, the shell is correspondingly located in the first hole and second hole, and the second stop part of the shell is clamped by the first fixed plate and the second fixed plate;
 a light valve disposed on a transmission path of the illumination beam and configured for converting the illumination beam into an image beam; and
 a projection lens disposed on a transmission path of the image beam.

* * * * *